United States Patent
Beaujot

(10) Patent No.: US 6,553,925 B1
(45) Date of Patent: Apr. 29, 2003

(54) NO-TILL STUBBLE ROW SEEDER GUIDANCE SYSTEM AND METHOD

(75) Inventor: Norbert Beaujot, Langbank (CA)

(73) Assignee: Straw Track Mfg., Inc., Langbank (CA)

(*) Notice: Subject to any disclaimer, the term of this patent is extended or adjusted under 35 U.S.C. 154(b) by 0 days.

(21) Appl. No.: 09/298,150

(22) Filed: Apr. 23, 1999

(51) Int. Cl.[7] ................................................ A01C 7/18
(52) U.S. Cl. ..................... 111/14; 111/903; 111/923; 111/924; 172/5; 180/401
(58) Field of Search .......................... 172/2, 3, 4, 4.5, 172/5, 6, 9, 439, 445.1, 445.2, 449; 701/50; 111/900, 903, 923, 924, 200, 14; 180/401

(56) References Cited

U.S. PATENT DOCUMENTS

| 4,100,862 A | * | 7/1978 | Mowen et al. | 111/924 X |
| 4,244,306 A | * | 1/1981 | Peterson et al. | 111/7 |
| 4,414,903 A | * | 11/1983 | Fasse et al. | 172/5 X |
| 4,624,197 A | * | 11/1986 | Drake | 111/52 |
| 4,821,807 A | * | 4/1989 | Trumm | 172/6 |
| 5,031,705 A | * | 7/1991 | Clemens | 172/6 |
| 5,040,613 A | * | 8/1991 | Dodd et al. | 172/5 |
| 5,088,561 A | * | 2/1992 | Jurgena | 172/5 |
| 5,148,873 A | * | 9/1992 | Barnes et al. | 172/5 |
| 5,181,572 A | * | 1/1993 | Andersen et al. | 172/5 X |
| 5,207,739 A | * | 5/1993 | Orthman | 172/5 |
| 5,240,079 A | * | 8/1993 | Schmidt | 172/6 |
| 5,255,756 A | * | 10/1993 | Follmer et al. | 172/6 X |
| 5,303,662 A | * | 4/1994 | Drake | 111/52 |
| 5,333,559 A | * | 8/1994 | Hodapp et al. | 111/152 |
| 5,509,486 A | * | 4/1996 | Anderson | 172/5 X |
| 5,685,246 A | * | 11/1997 | Zimmerman | 111/157 |

* cited by examiner

Primary Examiner—Victor Batson

(57) ABSTRACT

The invention provides a method of reducing plugging of a no-till seeder with crop residue by guiding the furrow openers of the seeder between the standing stubble rows of the previous crop. A guidance system is provided comprising sensing means to sense the standing stubble rows from the previous crop and to send a steering signal in response to changes in the relative position of the seeder to the standing stubble rows; and adjusting means to adjust the travel path of the seeder in response to the steering signals. The sensing means can sense the location of the standing stubble rows by contact therewith or by sensing the furrow from which the standing stubble rows extend. The position of the seeder relative to the towing vehicle is adjusted in response to steering signals sent by the sensing means.

19 Claims, 10 Drawing Sheets

NO-TILL STUBBLE ROW SEEDER GUIDANCE SYSTEM AND METHOD

This invention deals with the field of agricultural seeders and in particular a method of reducing plugging of such seeders with crop residue and a guidance system for such planters.

BACKGROUND

In many areas, notably the Great Plains of North America, there has recently been a large shift to no-till seeding for crops such as cereals, pulses and oilseeds. These crops are usually "solid-seeded", which most often means seeded in narrow rows from 6 to 12 inches apart. Discer seeders do provide essentially an even coverage of the field with no discernable rows, however such seeders are not used to the extent they once were, due to the preference for no-till seeding. The crops, when growing, cover the ground and are harvested as if there are no rows. This differentiates such crops from "row" crops such as corn and cotton which are planted in wider rows, from 24 to 36 inches apart.

One of the objects of no-till seeding is to leave the previous years plant residue, or stubble, standing as long as possible to catch snow and later to provide protection for new seedling crops from wind and evaporation. It is common practice when harvesting to cut the crop as high as possible in order to leave as much standing stubble as possible to catch snow and to minimize the amount of non-grain material, mainly straw, passing through the combine harvester. The straw that does pass through the combine is generally broken up and spread evenly over the land.

The crop plants grow from a furrow which is generally depressed in the soil by packing. The next spring when no-till seeding is taking place, the rows of standing stubble therefore generally extend from a depressed furrow that is still easily discernible in the soil.

Present no-till seeders generally use a hoe opener for making the furrows into which seed is deposited, although disc furrow openers are used as well. The openers are mounted on a frame, which is generally towed by a tractor rather than mounted thereon as is common with row crop seeders seed and fertilizer is passed through a delivery system and into the furrows. Seed and fertilizer may be delivered as a mixture, or in separate tubes to different locations on one furrow opener or to separate furrow openers for seed and fertilizer. The fertilizer is sometimes applied in a separate field operation wherein no seed at all is being applied.

Hoe furrow openers are presently preferred over disc openers, as they generally penetrate better and do not require the cost and maintenance of bearings and so forth. Disc openers are also subject to "hair-pinning", wherein straw is not cut but instead is pushed into the furrow, causing poor germination of the seed and drying out the soil in the furrow by a wick, action. U.S. Pat. No. 5,619,939 discusses and provides an apparatus for alleviating this hair-pinning problem. Both hoe and disc furrow openers' work better when they are passing through less crop residue. Straw tends to wrap around individual hoe openers and be dragged down the field, impairing the clean cut desired.

A major problem with hoe openers is that the standing stubble is often longer than the spacing between the furrow openers, and with hoe seeders it often does not pass between the openers, resulting in a wad of straw and plant residue being dragged down the field, plugging the seeder. Up until now, the only method used to alleviate this problem has been to provide more room for the straw and trash to move through between the hoe openers and between the frame and the ground. This has been done by increasing the spacing between the hoe openers, and thereby increasing the row spacing to 10 or 12 inches which is about the maximum spacing possible for these crops; by increasing the number of rows of hoe openers and thereby increasing the space between the hoe openers on a row; and finally by increasing the length of the hoe openers and thereby increasing the distance between the seeder frame and the ground.

When a seeder is seeding into standing stubble, the hoe openers constantly cross the standing stubble rows from the previous crop, knocking the stubble down. If the seeder was guided so that it only occasionally crossed a standing stubble row, such as when turning, much of the plugging problem could be alleviated, as the standing stubble rows would be left undisturbed and pass vertically under the seeder.

There is considerable prior art in the field of guidance systems to keep row crop implements aligned with furrows or plant rows. This is understandable because row spacing between passes must be kept constant at seeding in order to allow for efficient operation of subsequent cultivating, spraying and harvesting equipment. The prior art also provides guidance systems for working in growing row crops, where there is a sensor which senses the growing plant rows and keeps the implement between the rows. In solid-seeded crops, there has hitherto not been any perceived need for such precision since growing crops are not cultivated and sprayers and combines are operated without regard to where the narrow crop rows are located.

Guidance systems for use in row crops have not been used to guide an implement with respect to a row of standing stalks from the previous crop. There does not appear to have been any need for such guidance.

U.S. Pat. Nos. 5,255,756, 5,121,799, 5,094,300 and 5,031,704 are examples of such guidance systems for row crops. U.S. Pat. No. 5,148,873 provides a device to follow a furrow or growing crop row, thereby sending a signal to a guidance system.

SUMMARY OF THE INVENTION

It is the object of the present invention to provide a guidance system for a no-till seeder which will reduce the problem of plugging the seeder furrow openers with crop residue.

It is the further object of the present invention to provide such a guidance system for a no-till seeder which will reduce the amount of crop residue encountered by the furrow openers, thereby reducing straw dragging on hoe openers and hair-pinning of disc openers.

It is the further object of the present invention to provide such a guidance system for a no-till seeder which will leave a greater proportion of previous crop stubble standing after the seeding operation.

The present invention accomplishes these objects providing, in a no-till seeding application, a method of reducing plugging of seeders with crop residue from the previous year crop comprising the following steps: sensing the location of the standing stubble rows of the previous year crop; and guiding the furrow openers of the seeder between said standing stubble rows.

In a second aspect, the invention provides a guidance system for guiding a no-till seeder such that the furrow openers of said seeder travel along the field between the standing stubble rows from the previous crop, said guidance system comprising: sensing means to sense the standing stubble rows from the previous crop and to send a steering signal in response to changes in the relative position of the seeder to said standing stubble rows; and adjusting means to adjust the travel path of said seeder in response to said steering signals.

The standing stubble rows of the previous crop should have the same row spacing as the seeder being guided, or it will not be possible to have all furrow openers properly positioned is between the standing stubble rows.

Conveniently, the adjusting means could vary the path of travel of the seeder relative to the path of travel of the seeder towing vehicle.

In a third aspect the invention provides a guidance system for guiding a seeder towed by a vehicle, said guidance system sensing the location of the standing stubble rows left by a previous crop and in response to said sensing guiding the seeder so that the furrow openers of said seeder travel on a preferred path along the field between said standing stubble rows, said guidance system comprising: a row location sensor mounted on said seeder and adapted to sense the location of said standing stubble rows, said row location sensor sending a steering signal when said row location sensor senses that said furrow openers have deviated from said preferred path; a seeder position adjuster, said adjuster responsive to said steering signals; where in operation said row location sensor is in the neutral position when the furrow openers of said seeder are travelling on the preferred path between the standing stubble rows, and wherein when the seeder deviates from its preferred path said row location sensor sends a steering signal to said seeder position adjuster which causes said adjuster to move the seeder to one side or the other relative to the towing vehicle so as to direct said seeder back on to the preferred path.

The invention could further comprise a seeder position indicator viewable by the operator. The operator could then steer the towing vehicle to keep the row location sensor within its proper range of operation.

The seeder position adjuster could exert a force between the towing vehicle and the seeder and act to move the seeder to the right or left relative to the towing vehicle.

Where the towing vehicle is a tractor with a swinging draw-bar the seeder position adjuster could be a swinging draw-bar position adjuster and operate to move the swinging draw-bar right or left relative to the tractor.

Where the towing vehicle is not a tractor with a swinging draw-bar, such as when the towing vehicle is a tow-between air-seeder cart or where it is desired to provide a self-contained device, the seeder hitch could comprise a first hitch member attached to the towing vehicle, and a second hitch member engaged in the first hitch member such that the second hitch member may move laterally right or left with respect to the first hitch member when the seeder position adjuster is activated by the steering signals. The seeder position adjuster could conveniently comprise a hydraulic cylinder acting between the first and second hitch members wherein the hydraulic cylinder is activated by a solenoid valve receiving the steering signals.

Alternatively, the seeder hitch could include a laterally pivoting linkage and the seeder position adjuster could act on the pivoting linkage to move the seeder right or left relative to the towing vehicle. The seeder position adjuster could conveniently comprise a hydraulic cylinder acting on the linkage wherein the hydraulic cylinder is activated by a solenoid valve receiving the steering signals.

The row location sensor could sense the standing stubble rows of the previous crop by contact with the standing stubble rows which contact causes the row location sensor to move laterally to the right or left. The row location sensor could be a wedge-shaped pan sliding on the ground, the wedge-shaped pan having a width smaller than the spacing between standing stubble rows. A drag stabilizer attached to each side of the wedge-shaped pan would stabilise the pan, reducing bouncing when bumps are encountered and further helping to maintain its position between the standing stubble rows. A flexible link chain could be used as a drag stabilizer.

The wedge-shaped pan could be attached to a leg, and the leg could be attached to the seeder such that the leg may pivot vertically and laterally. Thus the pan could rise and fall vertically to follow contours or bumps in the ground, and the steering signal could be generated by the lateral angular position of the attachment. As the seeder veered off the preferred path wherein the furrow-openers are between the standing stubble rows, the leg would pivot laterally. This lateral movement could send a steering signal to the swinging draw-bar position adjuster.

The steering signals could be generated by a contact arm the proximate end of which is fixedly attached to the leg such that the distal end:of the contact arm is laterally between right and left signal points such that lateral movement of the leg and pan to the left causes the distal end to contact a left signal point, sending a steering signal to the seeder position adjuster adjusting the path of the seeder to the left, and such that lateral movement of the row location sensor to the right causes the distal end to contact a right signal point, sending a steering signal to the seeder position adjuster adjusting the path of the seeder to the right.

If the contact arm was flexible, damage to the signal points would be avoided. The flexible arm would also tend to position the row location sensor in the middle or neutral position when the seeder is raised for turns, since as the row location sensor swung to one direction, the flexible arm would bring it back and accelerate it to the centre neutral position.

Alternatively, the row location sensor could sense the furrow in the ground from which the standing stubble rows extend. The row location sensor could measure the distance from the seeder frame to the ground at two laterally spaced points and sense the difference between these two distances to determine the location of the furrow and thereby sense the location of the standing stubble rows. The row location sensor could use sonar or radar to determine the distances from the seeder frame to the ground.

Using mechanical means, the row location sensor could comprise first and second laterally spaced sensing elements adapted to ride along the ground, each of which may move vertically independently of the other, wherein the steering signals are generated by the vertical movement of one the sensing element relative to the other. The row location sensor could comprise a sensing element frame; the first sensing element pivotally attached to the sensing element frame about a horizontal axis substantially perpendicular to the direction of seeder travel such that the first sensing element may pivot up and down; the second sensing element pivotally attached, at a point laterally spaced from the first sensing element, to the sensing element frame about a horizontal axis substantially perpendicular to the direction of seeder travel such that the second sensing element may pivot up and down; a first contact element extending from the first sensing element in the direction of the second element; upper and lower second contact elements extending from the second sensing element in the direction of the first sensing element such that when the first sensing element moves up relative to the second sensing element, the first contact element comes in contact with the upper second contact element, sending a first steering signal to the seeder position adjuster, and such that when the first sensing element moves down relative to the second sensing element, the first contact element comes in contact with the lower second contact element, sending a second steering signal to the seeder position adjuster.

For increased efficiency of operation, the guidance system could further comprise a second row location sensor mounted on the seeder at a different location from the first row location sensor and adapted to sense the location of the standing stubble rows, and a control by which the operator may select which of the row location sensor guides the seeder, thereby allowing the operator to choose the row location sensor where the standing stubble rows or furrows are most suitable and avoid a row location sensor position where the standing stubble rows have been trampled by a previous field operation. Alternatively the sensor control could also allow both sensors to send steering signals, thereby allowing the seeder to be guided by both sensors at the same time.

The invention could further comprise a furrow sensor attached to the seeder such that the furrow sensor follows the end furrow of the last seeding pass thus acting as a marker to properly space the present seeder pass from the previous seeder pass, the furrow sensor sending a steering signal when the furrow sensor is moved perpendicular to the direction of seeder travel by the deviation of the seeder from the proper path, and further comprising a control whereby the operator can select which of the steering signals, that of the row location sensor or the furrow sensor, guides the seeder. With this arrangement, on turns the operator could align the seeder properly with respect to the previous pass using the furrow follower, and then switch the guidance control to allow the row follower to guide the seeder with the furrow openers between the rows.

Such a furrow sensor could comprise a curved tube adapted to follow the end furrow of the previous seeder pass, the tube attached to the seeder such that the tube may pivot vertically and laterally, and wherein the steering signal is generated by the lateral angular position of the attachment. Alternatively the row location sensor described above for sensing the furrow out of which the standing stubble rows extend could be used.

Where the previous crop was lentils or peas where there are no standing stubble rows, the furrow sensor could be used at all times to guide the seeder in proper relation to the previous pass.

It will be understood that in this application the word seeder is used in the generic sense to signify an agricultural implement that makes furrows in the soil and delivers seed or fertilizer or a combination thereof into the furrows.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
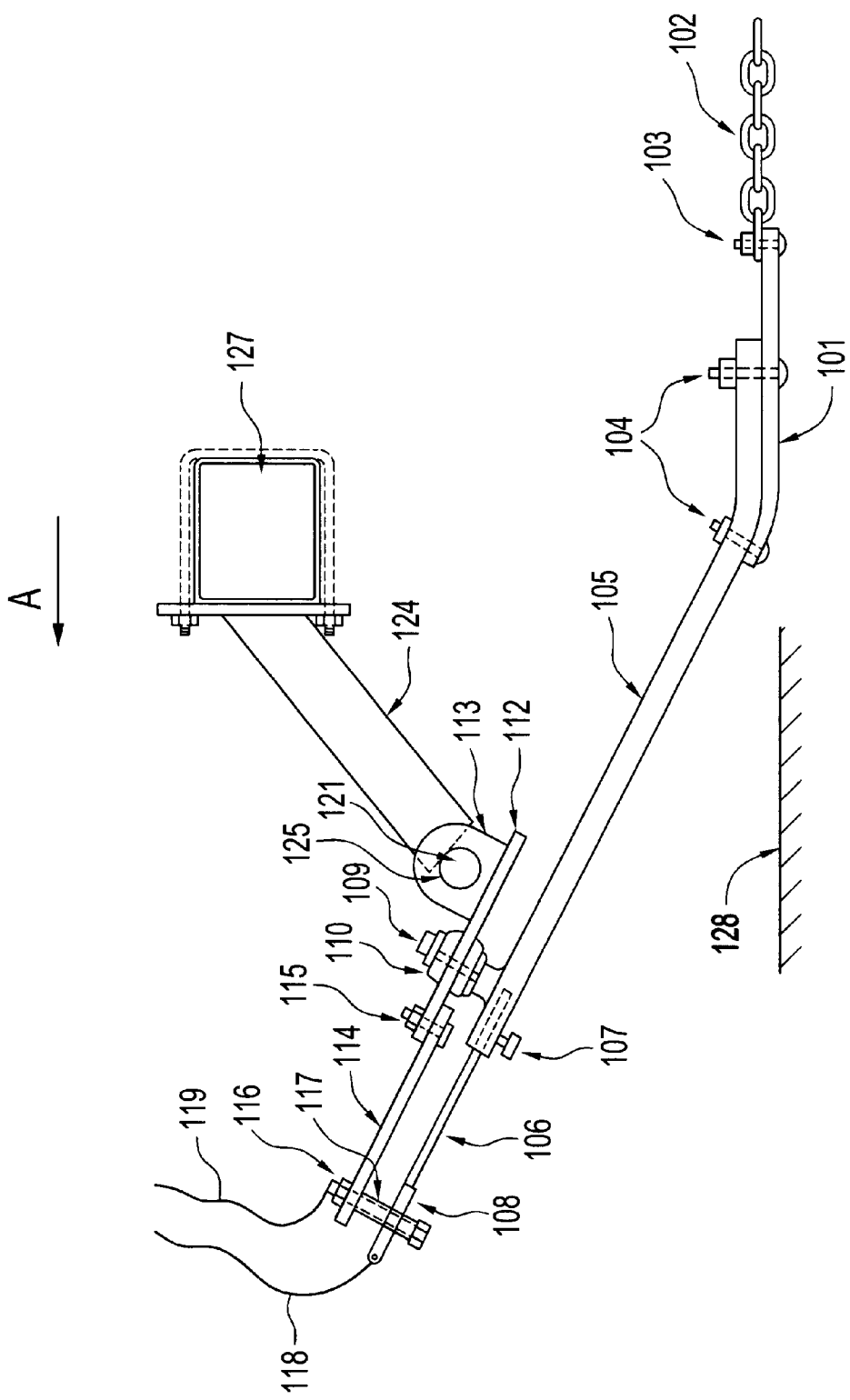
FIG. 1 is a side view of an embodiment of the row location sensor and steering signal generator which senses the standing stubble rows by contact with the standing stubble.
Figure 2:
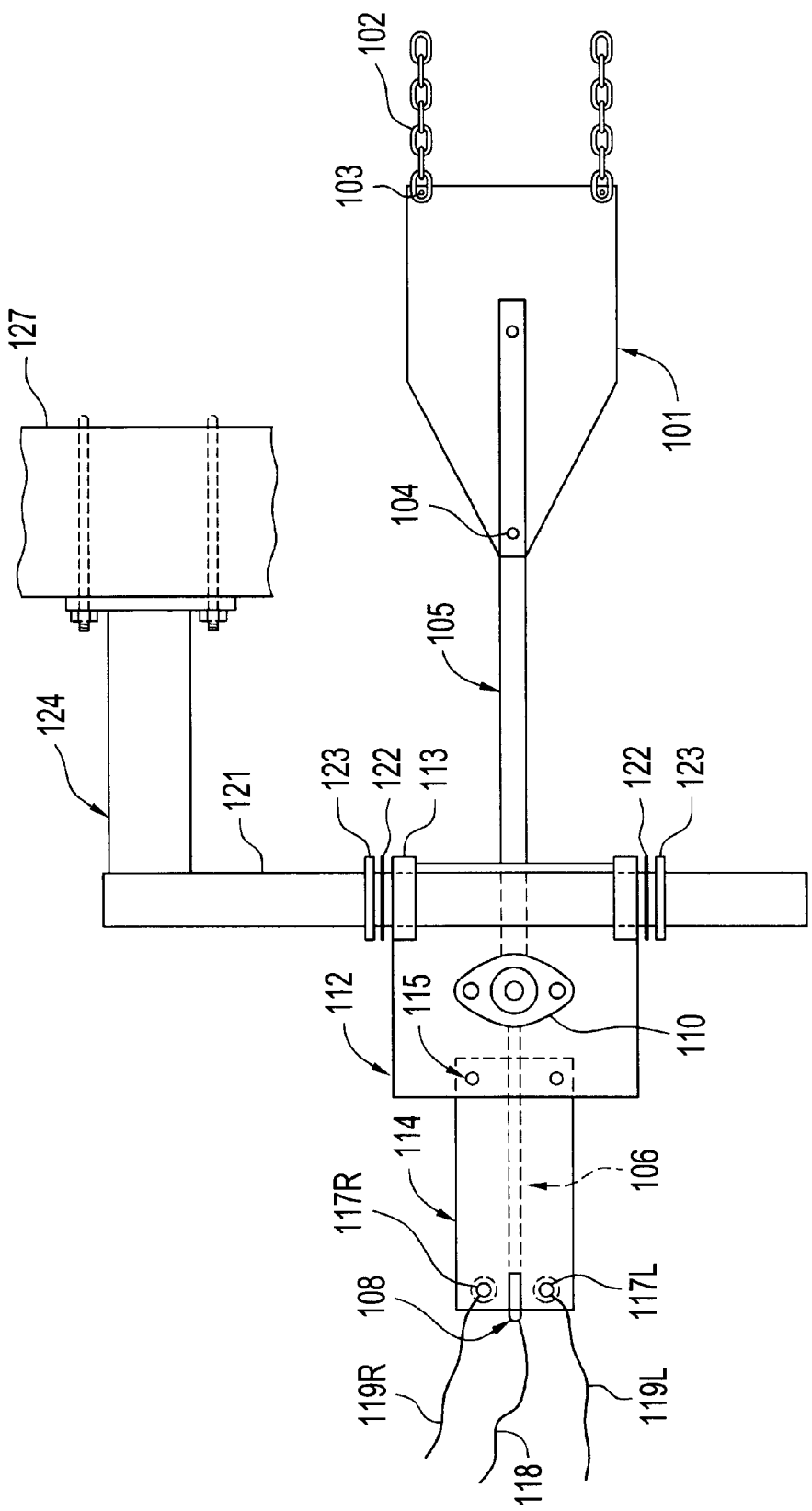
FIG. 2 is a top view of the apparatus of FIG. 1.
Figure 3:
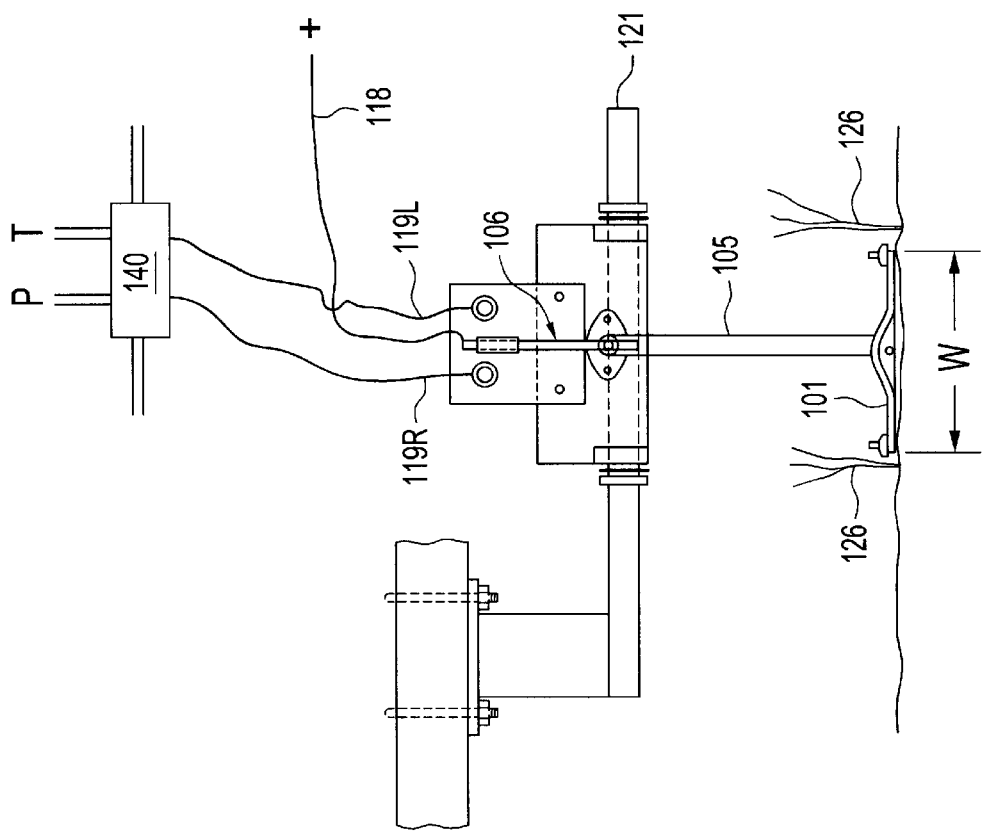
FIG. 3 is a front view of the apparatus of FIG. 1.

A row location sensor for sensing the standing stubble rows by contacting the standing stubble, and a steering signal generator are illustrated in FIGS. 1–3. The seeder is travelling in direction A. Sensor support arm 124 is fixed to the seeder frame member 127 and shaped to position vertical pivot shaft 121 ahead of and below the seeder frame member 127 so that a satisfactory lateral motion can be established. Pivot plate 112 is pivotally attached to the sensor support arm 124 by the vertical pivot shaft 121 through vertical pivot hole 125 in the vertical pivot lugs 113. Clamps 123 and washers 122 secure the location of the pivot plate 112 along the vertical pivot shaft 121, and allow for adjustment thereon to position the standing stubble row location sensor 101 so that the furrow openers on the seeder will travel between the standing stubble rows 126 of the previous crop.

Sensor leg 105 is attached to the pivot plate 112 by lateral pivot shaft 109 secured in bearing 110 such that the leg may move laterally from side to side. Standing stubble row location sensor 101 is a wedge-shaped plastic pan, with a width W slightly less than the row spacing of the standing stubble rows 126, as best seen in FIG. 3. Row location sensor 110 is fixed to the sensor leg 105 by fasteners 104. Standard flexible chains 102 are attached at each side of the row location sensor 101 by fasteners 103 and act to stabilize the row follower 101 as it slides along the ground, as well as helping to maintain the pan in its proper position between standing stubble rows.

The configuration described has the benefit of tending to return the row follower 101 to the centre position as shown in FIG. 2 when the row follower 101 is raised from the ground with the frame 127 on turns and so forth. With the lateral pivot shaft on an angle to the vertical, as the row follower 101 moves to the side it also rises somewhat and gravity will draw it to the lowest centre position.

Contact arm 106 is a flexible fibreglass rod fixed to the front end of the sensor leg 105 by fastener 107, and extending forward between left and right signal points 117L and 117R. Left and right signal points 117L and 117R are secured to pivot plate extension 114 by fasteners 116L and 116R. Pivot plate extension 114 is a non-conductive material, such as plastic, to facilitate connection of the left and right signal wires 119L and 119R to the corresponding signal points 117L and 117R, and is fixed to the front of the pivot plate 112 by fasteners 115.

The contact arm 106 has a metal tip 108 connected to a power wire 118. Thus when the row follower 101 and sensor leg move laterally a certain distance, the metal tip contacts the left or right signal point 117L or 117 R, sending current through the corresponding signal wire 119L or 119R to directional solenoid valve 140.

The flexibility of the contact arm 106 prevents damage to the signal points 117L and 117R and also tends to throw the row follower 101 to the centre position when raised, aided by gravity as described above.

Figure 4:
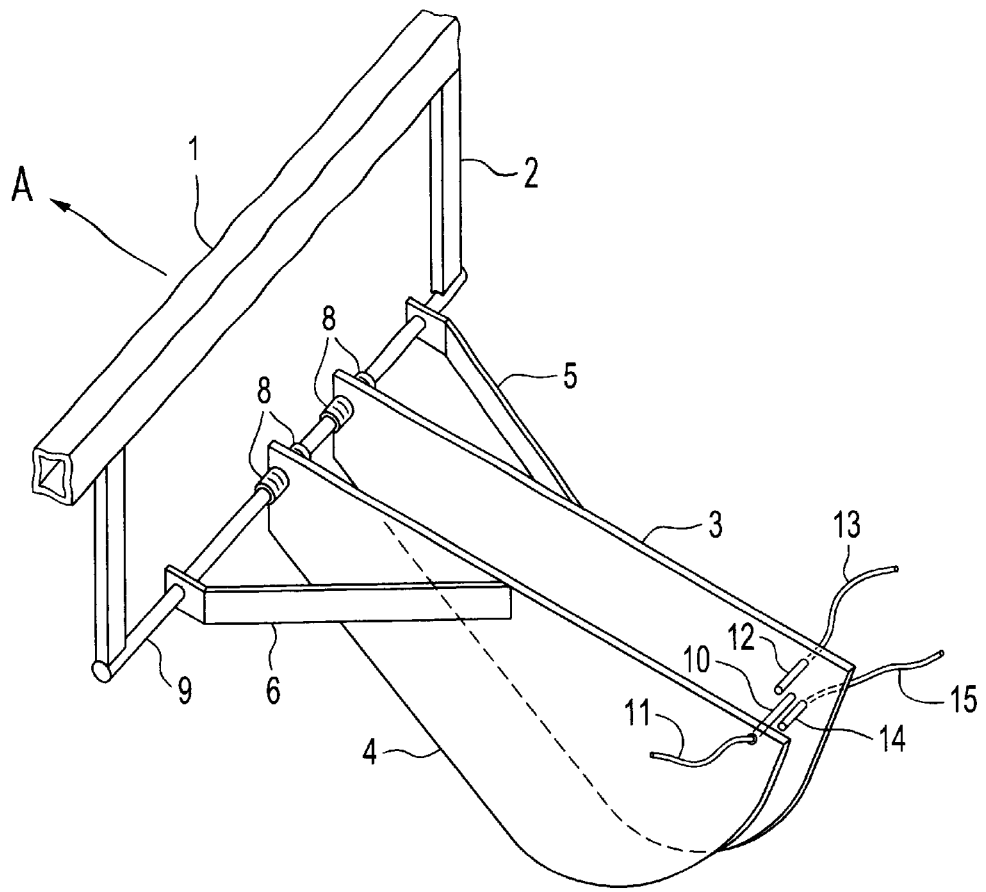
FIG. 4 is a perspective view of an embodiment of the row location sensor and steering signal generator which senses the standing stubble rows by sensing the furrow from which the standing stubble extends.
Figure 5:
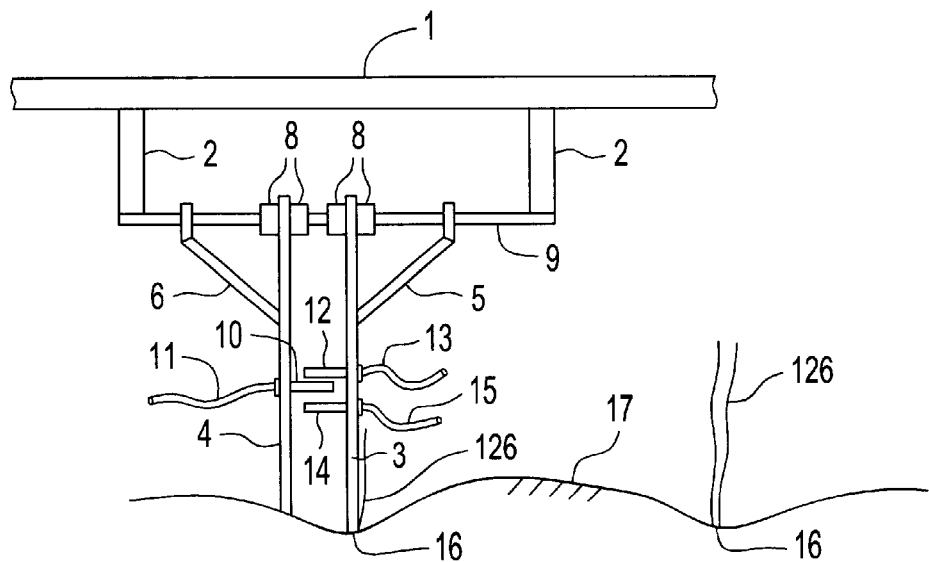
FIG. 5 is a rear view of the apparatus of FIG. 4.

An alternate row location sensor for sensing the standing stubble rows by sensing the furrow from which the standing stubble extends, and a steering signal generator are illustrated in FIGS. 4 and 5. The seeder is travelling in direction A. The sensing elements, being sensor plates 3, 4 are mounted on a sensing element frame 1 attached to the seeder frame so that the pivot shaft 9 is substantially horizontal and perpendicular to the direction of travel A. The pivot shaft 9 passes through holes in the right sensor plate 3 and left sensor plate 4 for pivotal attachment such that the sensor plates 3, 4 may pivot up and down independently. Lateral supports 5, 6 are attached to the right and left sensor plates 3, 4 and pivotally attached to the pivot shaft 9 in order to maintain the proper orientation of the sensor plates 3, 4 aligned with the direction of travel A. The sensor plates 3, 4 may be positioned at the proper point along the pivot shaft 9 so that the furrow openers are traveling on the preferred path between the standing stubble rows 126. Lock rings 8 on each side of each sensor plate 3, 4 are tightened to maintain the sensor plates 3, 4 in the proper position.

A first contact element 10 extends from the left sensor plate 4 in the direction of the right sensor plate 3. Upper and lower second contact elements 12, 14 extend from the right sensor plate 3 in the direction of the left sensor plate 4 and are arranged such that when the left sensor plate 4 moves up relative to the right sensor plate 3, the first contact element 10 comes in contact with the upper second contact element 12 and such that when the left sensor plate 4 moves down relative to the right sensor plate 3, the first contact element 10 comes in contact with the lower second contact element 14. Power is supplied to the first contact element 10 through wire 11.

As illustrated in FIG. 5, the furrow 16 is a depression in the soil. When the furrow sensor is off line as illustrated, the left sensor plate 4 moves up relative to the right sensor plate 3, causing the first contact element 10 to come in contact with the upper second contact element 12, sending a first steering signal through the wire 13 to the seeder position adjuster which causes the seeder to steer to the right, back into the furrow 16. The opposite signal is sent when the seeder deviates to the right of the furrow 16.

The furrow sensor could also be used to sense the ridge 17 between the furrows 16, however it is more accurate to measure the relatively narrow furrow 16. The furrow sensor can be adapted to measure any such regular mark in the soil defined by a variation in elevation, either as a ridge or as a depression.

Figure 6:
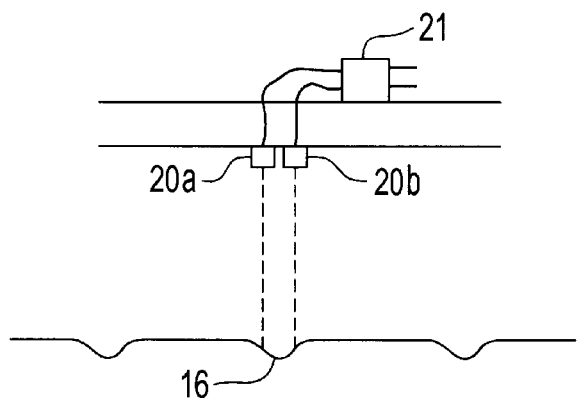
FIG. 6 is a front view of a row location sensor which senses the standing stubble rows by sensing the furrow using radar or sonar.

FIG. 6 shows another system that could be used to sense the standing stubble rows by sensing the furrow. Two radar or sonar distance sensors 20a and 20b are located to sense the distance to the ground at two points a similar distance apart to the right and left sensor plates 3, 4 illustrated in FIGS. 4 and 5. The difference in the distance to the ground at the two points is compared comparator 21, which sends an appropriate steering signal to the seeder position adjuster.

Figure 7:
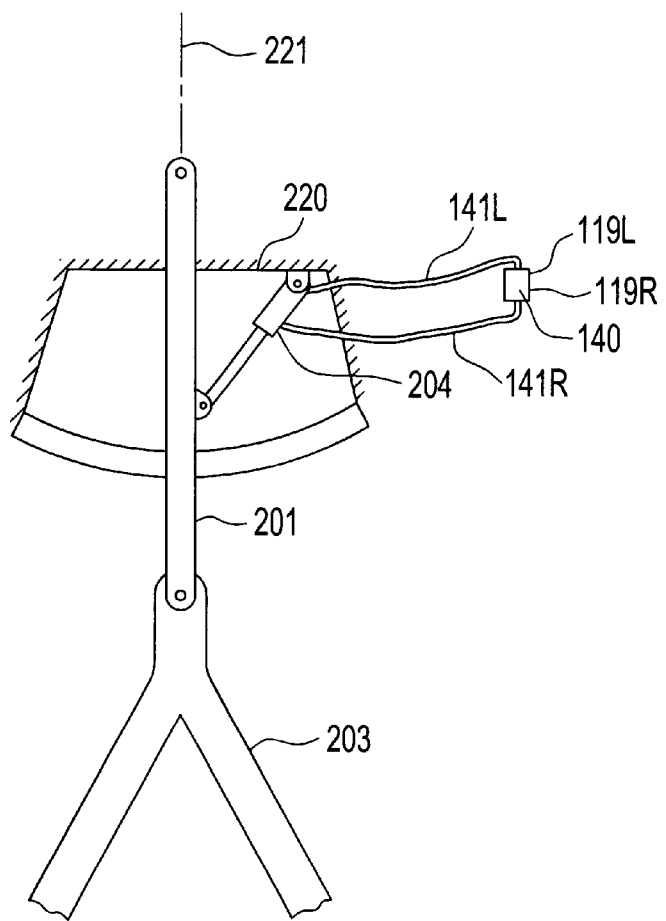
FIG. 7 is a top view of an embodiment of the seeder position adjuster.

Referring to FIG. 7, hydraulic lines 141L and 141R direct hydraulic fluid from the solenoid valve 140 to the appropriate side of the draw-bar positioning double acting hydraulic cylinder 204. Cylinder 204 is pivotally attached at one end to the tractor frame 220 and at the opposite end to the swinging draw-bar 201. Cylinder 204 extends or retracts in response to the activation signals received by the solenoid 140, thereby moving the swinging draw-bar 201 and seeder hitch 203 laterally with respect to the centre-line of the tractor 221. As the seeder hitch moves laterally the seeder frame 127 moves laterally with respect to the row location sensor 101 causing the contact arm metal tip 108 to move out of contact with the signal point 117.

Figure 13:
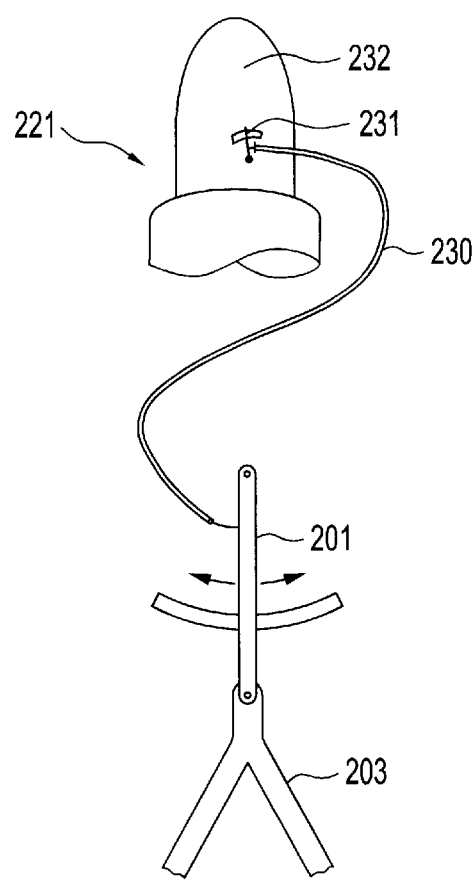
FIG. 13 is a schematic drawing of an embodiment of the seeder position indicator.

Referring to FIG. 13, control cable 230 is attached at one end to the swinging draw-bar 201 and at the opposite end to a seeder position indicator 231 mounted in front of the operator on the hood of the tractor 232. As the draw-bar 201 is moved laterally, the operator can see the corresponding movement of the indicator 231, and so can steer the tractor so that the indicator 231 is kept in the operating range.

Figure 8:
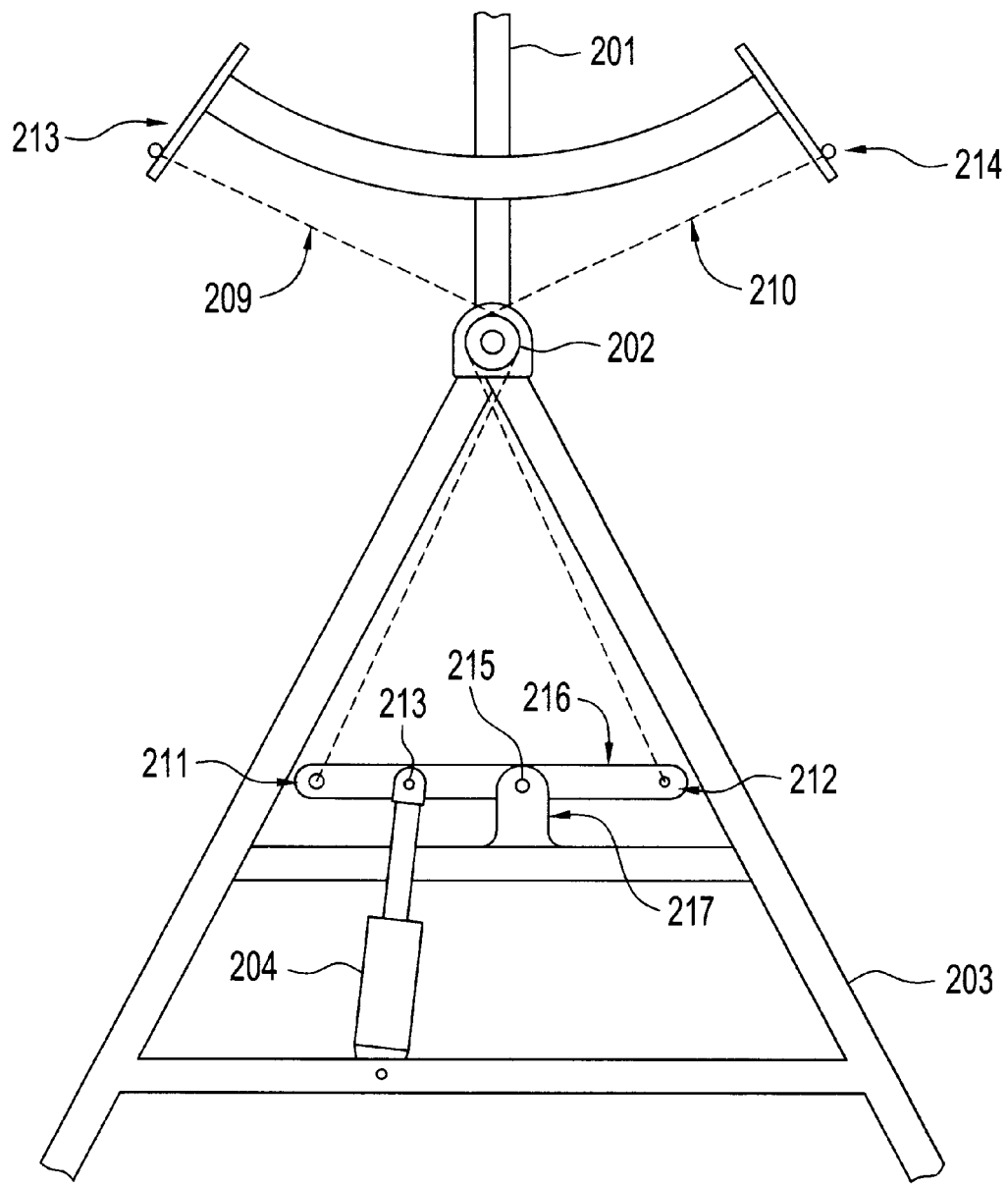
FIG. 8 is a top view of the seeder position adjuster of an alternate embodiment using cables and a pivot arm to adjust the draw-bar position.
Figure 9:
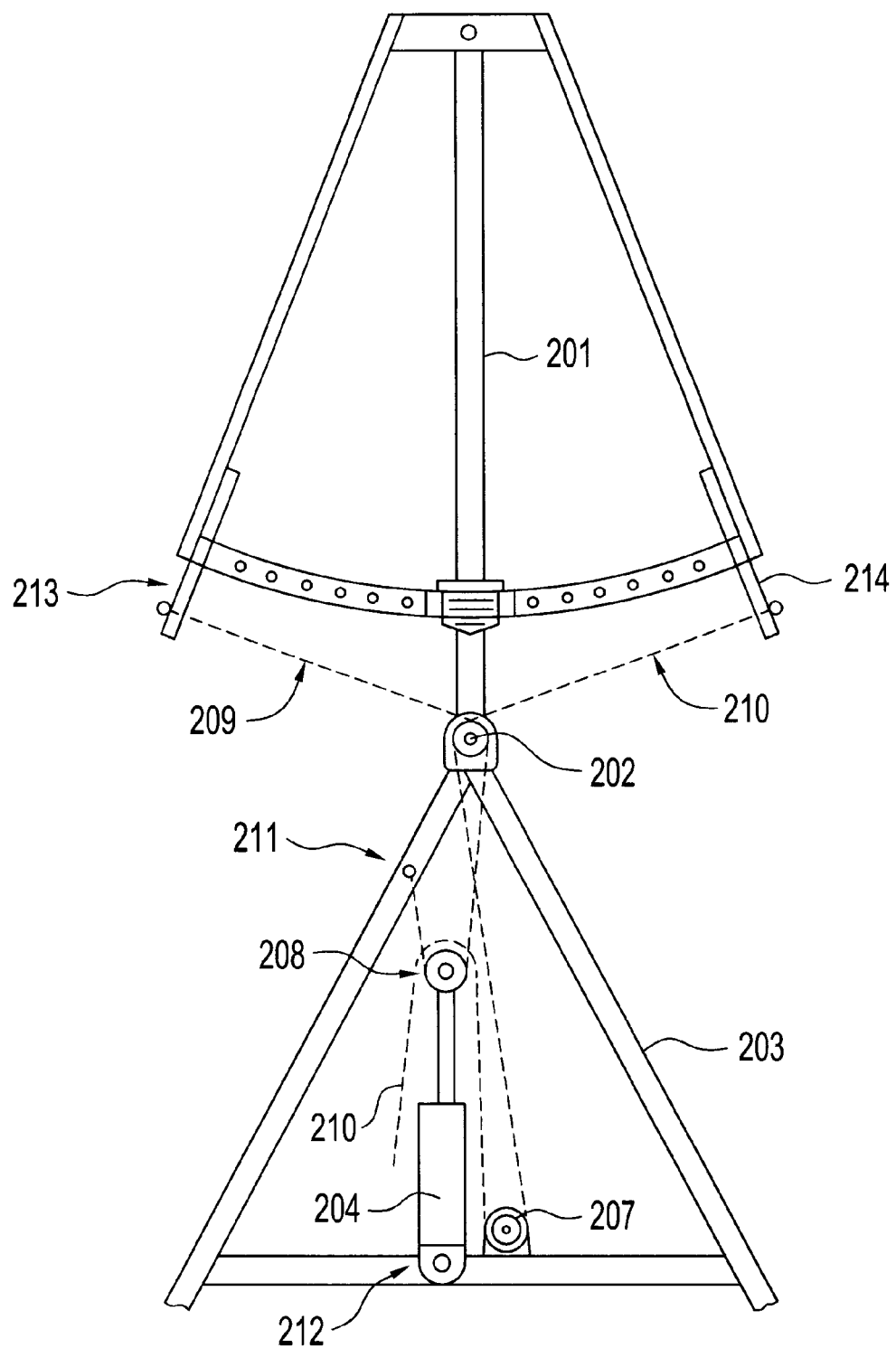
FIG. 9 is a top view of the seeder position adjuster of an alternate embodiment using cables to adjust the draw-bar position.
Figure 10:
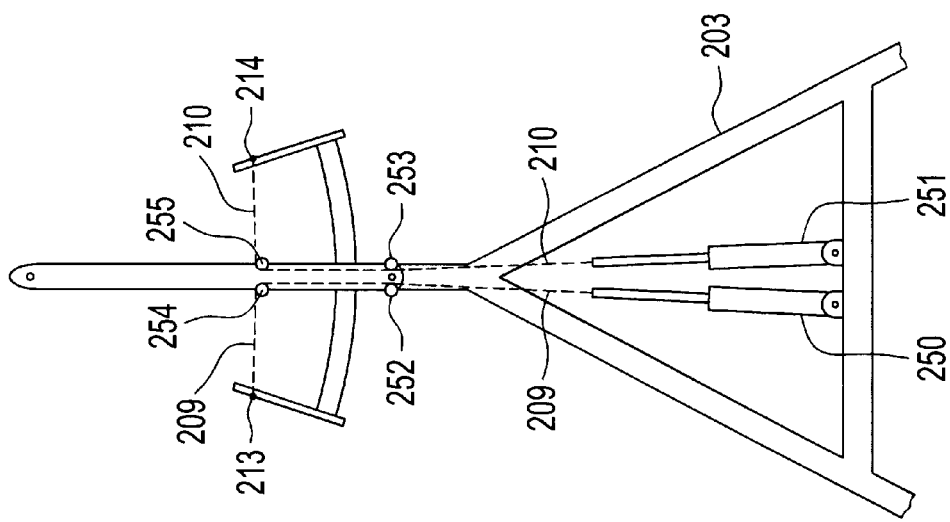
FIG. 10 is a top view of the seeder position adjuster of an alternate embodiment using two single acting cylinders to adjust the draw-bar position.

FIGS. 8, 9 and 10 show alternate seeder position adjusters using a pivoting linkage. In FIG. 7, pivot arm 216 is pivotally attached at its mid-point to hitch lugs 217 by pin 215.

Double acting hydraulic cylinder 204 is pivotally attached at one end to the seeder hitch 203 and at the opposite end to the pivot arm 216. Left cable 209 is attached at one end to the left pivot arm attachment point 211, then passes around the right side of double grooved draw-bar pulley 202, the left cable 209 engaging the lower pulley groove, and then attaching to left tractor attachment point 213. Right cable 210 is attached at one end to the right pivot arm attachment point 212, then passes around the left side of double grooved draw-bar pulley 202, the right cable 210 engaging the upper pulley groove, and then attaching to right tractor attachment point 214. Left and right pivot arm attachment points 211 and 212 are equidistant from the pivot arm pivot point at pin 215. Cylinder 204 receives hydraulic fluid from the solenoid valve 140 and shifts the swinging draw-bar to the left or right.

FIG. 9 illustrates another possible cable arrangement which would act to move the swinging draw-bar in response to hydraulic fluid from solenoid valve 140 supplied to a double acting hydraulic cylinder 204, with the cables guided by cylinder pulley 208 and hitch pulley 207.

FIG. 10 illustrates a seeder position adjuster using two single acting cylinders 250 and 251. The cables 209 and 210 are guided by left and right draw-bar cable guides 252 and 253 and left and right draw-bar pulleys 254 and 255. Instead of directing hydraulic fluid to one side or the other of a double acting hydraulic cylinder as in previous cases, the solenoid valve 140 directs oil to one or the other of the cylinders 250 or 251 in order to move the swinging draw-bar 201 to the right or left.

Figure 11:
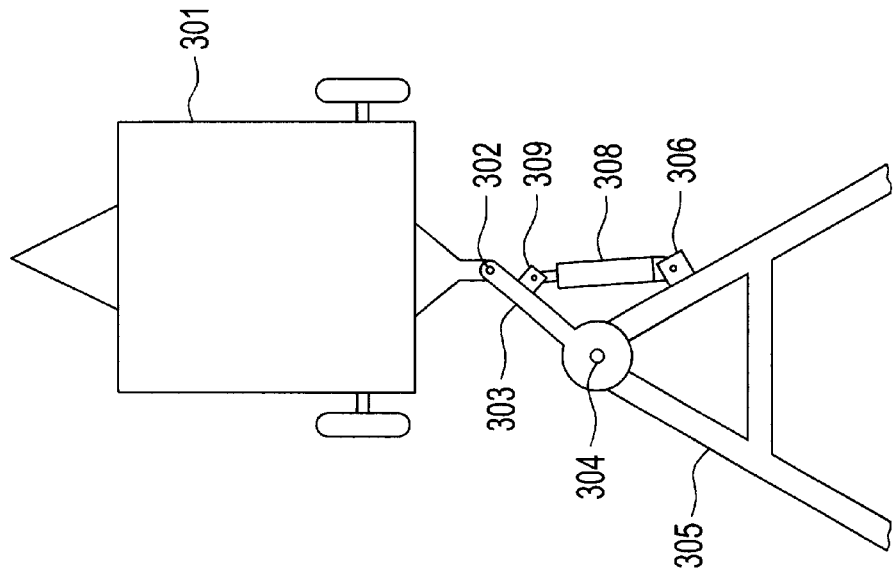
FIG. 11 is a top view of the seeder position adjuster of an alternate embodiment wherein the towing vehicle is a tow-between air-seeder cart having no swinging draw-bar.

FIG. 11 illustrates a seeder position adjuster of an alternate embodiment wherein the towing vehicle is a tow-between air-seeder cart 301 having no swinging draw-bar. The seeder hitch has a laterally pivoting linkage 303 between the draw pin 302 and the seeder hitch 305, attached to the seeder hitch 305 at the seeder pivot point 304. Double acting hydraulic cylinder 308 is pivotally attached at one end to hitch lugs 306 and at the opposite end to linkage lugs 309. The hydraulic cylinder 308 receives fluid from a solenoid valve activated by the row location sensor as in previous embodiments, thereby moving the seeder left or right relative to the tow-between air-seeder cart 301.

Figure 12:
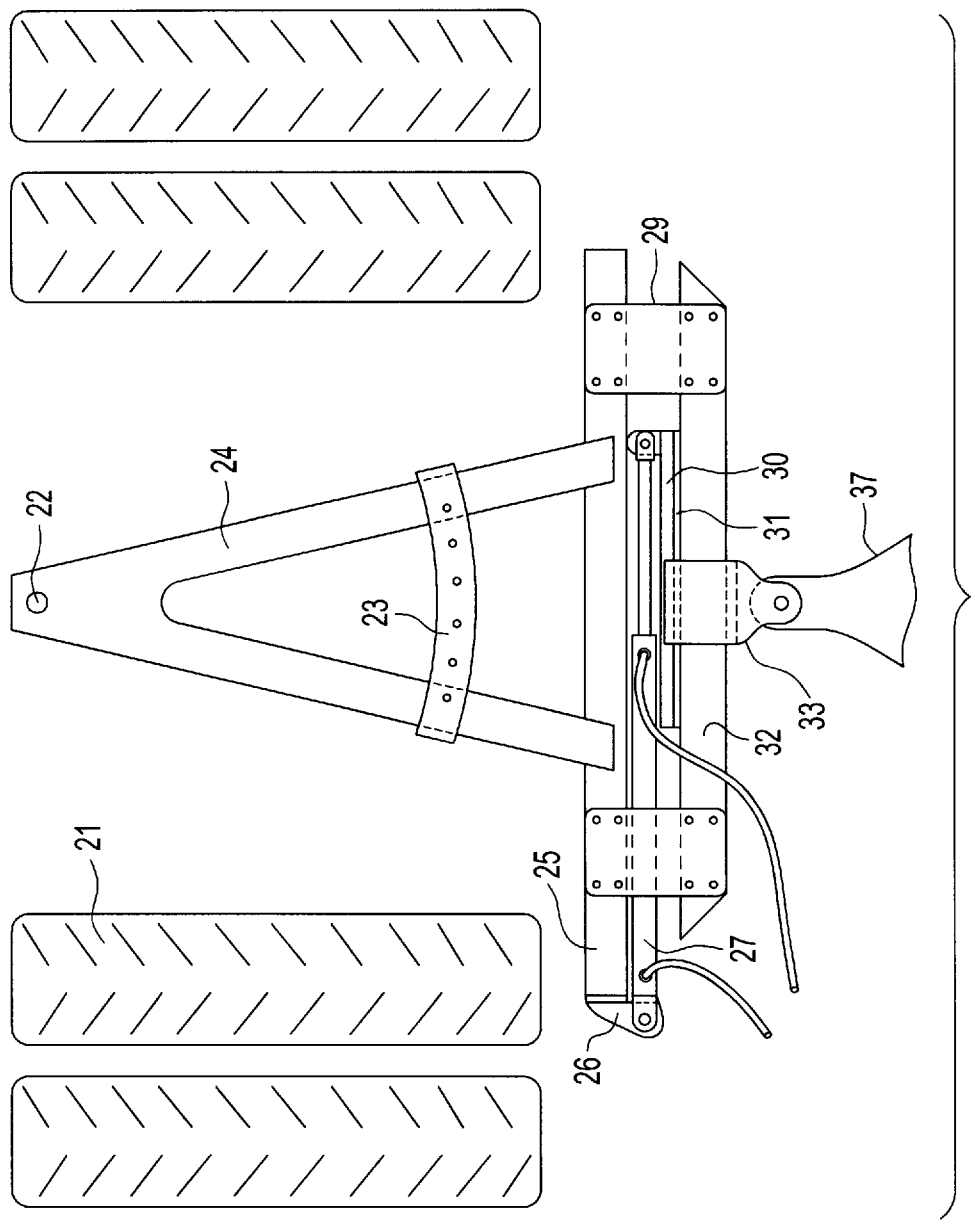
FIG. 12 is a top view of the seeder position adjuster of an alternate embodiment wherein the towing vehicle is a tractor.

FIG. 12 shows another alternate seeder position adjuster mounted on a tractor. The regular hitch is removed from the tractor 21 and main hitch support 24 is attached in its place by anchor pin 22 and is supported in the draw bar guide 23 of the tractor 21. First hitch member 26 comprises an inner and outer hitch member 25, 32 connected by frame plates 29. Slide hitch member 30 is engaged in a groove 31 on the inside of the outer hitch member 32 such that same may slide along the length of outer hitch member 32 in response to the extension or retraction of the hydraulic cylinder 27 as dictated by the steering signals. Second hitch member 33 is fixed to slide hitch member 30 and moves with same laterally along outer hitch member 32. The seeder hitch 37 is attached to second hitch member 33 and the seeder is thereby adjusted in its path of travel so that the furrow openers will travel between the standing stubble rows.

Figure 14A:
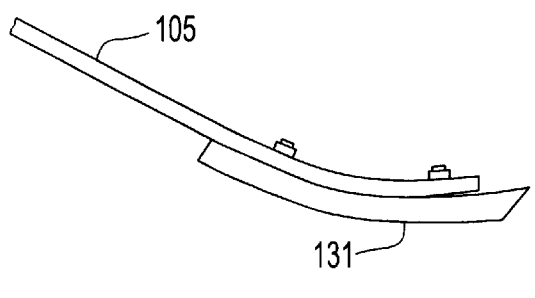
FIG. 14 is a side and a rear view of a furrow sensor for use with the embodiment.
Figure 14B:
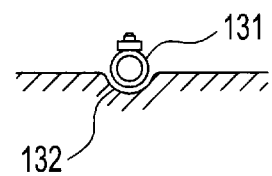

FIG. 14 shows a furrow sensor 131 attached to the sensor leg 105 in substitution for the row location sensor 101, thereby converting the system from one which guides the seeder furrow openers between the standing stubble rows to one which guides the seeder in proper relation to the previous seeder pass.

This is useful when seeding land where the previous crop were peas, lentils or such which leave no discernable standing stubble rows.

The apparatus is mounted on the seeder frame 127 such that when the furrow sensor 131 is located in the end furrow 132 of the previous seeder pass, the end furrow of the present seeder pass is properly spaced from the previous pass. Alternatively, the system could comprise two apparatus, one for guiding with respect to standing stubble rows and one for guiding with respect to the previous pass. A switch would allow the operator to choose which was guiding the seeder at any time.

Similarly, two row location sensors with a switch would allow the operator to choose the guiding sensor, and use the sensor on a row where the standing stubble rows were not tramped down by a previous operation such as combining. Alternatively, both sensors could be operating, with the seeder guided by signals from both sensors. When conflicting steering signals were sent to the solenoid valve, the solenoid would not be activated. This system could be useful where the standing stubble rows were not distinct and standing up well.

The system could also incorporate a manual over-ride, allowing the operator to move the swinging draw-bar to any desired position regardless of the sensor position. This would be especially useful on turns to allow the operator to locate the row location sensor in the proper standing stubble rows with respect to the previous seeder pass.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A guidance system for guiding a seeder towed by a vehicle, said guidance system sensing locations of standing stubble rows left by a previous crop and in response to said sensing guiding the seeder so that furrow openers of said seeder travel on a preferred path between said standing stubble rows, said guidance system comprising:

a row location sensor mounted on said seeder and adapted to sense the location of said standing stubble rows by contact with said standing stubble rows which contact causes said row location sensor to move laterally to the right or left, said row location sensor sending a steering signal when said row location sensor senses that said furrow openers have deviated from said preferred path;

wherein said row location sensor is a wedge-shaped pan sliding on the ground, said wedge-shaped pan having a width smaller than the spacing between the standing stubble rows;

a seeder position adjuster, said adjuster responsive to said steering signals;

where in operation said row location sensor is in a neutral position when the furrow openers of said seeder are travelling on the preferred path between the standing stubble rows, and wherein when the seeder deviates from its preferred path said row location sensor sends the steering signal to said seeder position adjuster which causes said adjuster to move the seeder to one side or the other relative to the towing vehicle so as to direct said seeder back on to the preferred path.

2. The invention of claim 1 wherein said row location sensor further comprises a drag stabilizer attached to each side of said wedge-shaped pan.

3. The invention of claim 2 wherein said wedge-shaped pan is attached to a leg, and said leg is attached to said seeder such that said leg may pivot vertically and laterally.

4. The invention of claim 3 wherein said steering signal is generated by the lateral angular movement of said leg.

5. The invention of claim 3 wherein said steering signals are generated by a contact arm a proximate end of which is fixedly attached to said leg such that a distal end of said contact arm is laterally between right and left signal points such that lateral movement of said pan to the left causes said distal end to contact a left signal point, sending a steering signal to said seeder position adjuster causing said seeder position adjuster to adjust the path of said seeder to the left, and such that lateral movement of said pan to the right causes said distal end to contact a right signal point, sending the steering signal to said seeder position adjuster causing said seeder position adjuster to adjust the path of said seeder to the right.

6. The invention of claim 5 wherein said contact arm is flexible.

7. The invention of claim 2 wherein said drag stabilizer comprises a flexible chain.

8. A guidance system for guiding a seeder towed by a vehicle, said guidance system sensing locations of standing stubble rows left by a previous crop and in response to said sensing guiding the seeder so that furrow openers of said seeder travel on a preferred path between said standing stubble rows, said guidance system comprising:

a row location sensor mounted on said seeder and adapted to sense the location of said standing stubble rows by sensing a furrow in the ground from which said standing stubble rows extend;

a seeder position adjuster, said adjuster responsive to said steering signals;

where in operation said row location sensor is in a neutral position when the furrow openers of said seeder are travelling on the preferred path between the standing stubble rows, and wherein when the seeder deviates from its preferred path said row location sensor sends the steering signal to said seeder position adjuster which causes said adjuster to move the seeder to one side or the other relative to the towing vehicle so as to direct said seeder back on to the preferred path.

9. The invention of claim 8 wherein said row location sensor measures a distance from a seeder frame to the ground at two laterally spaced points and senses the difference between these two distances to determine the location of said furrow and thereby senses the location of said standing stubble rows.

10. The invention of claim 9 wherein said row location sensor uses sonar to determine said distances from the seeder frame to the ground.

11. The invention of claim 9 wherein said row location sensor uses radar to determine said distances from the seeder frame to the ground.

12. The invention of claim 9 wherein said row location sensor comprises first and second laterally spaced sensing elements adapted to ride along the ground, each of which may move vertically independently of the other and wherein said steering signals are generated by the vertical movement of one said sensing element relative to the other.

13. The invention of claim 12 comprising:

a sensing element frame;

said first sensing element pivotally attached to said sensing element frame about a horizontal axis substantially perpendicular to the direction of seeder travel such that said first sensing element may pivot up and down;

said second sensing element pivotally attached, at a point laterally spaced from said first sensing element, to said sensing element frame about a horizontal axis substantially perpendicular to the direction of seeder travel such that said second sensing element may pivot up and down;

a first contact element extending from said first sensing element in the direction of said second element;

upper and lower second contact elements extending from said second sensing element in the direction of said first sensing element such that when said first sensing element moves up relative to said second sensing element, said first contact element comes in contact with said upper second contact element, sending a first steering signal to said seeder position adjuster, and such that when said first sensing element moves down relative to said second sensing element, said first contact element comes in contact with said lower second contact element, sending a second steering signal to said seeder position adjuster.

14. A guidance system for guiding a seeder towed by a vehicle, said guidance system sensing locations of standing stubble rows left by a previous crop and in response to said sensing guiding the seeder so that furrow openers of said seeder travel on a preferred path between said standing stubble rows, said guidance system comprising:

a first row location sensor mounted on said seeder and adapted to sense the location of said standing stubble rows, said first row location sensor sending a first steering signal when said first row location sensor senses that said furrow openers have deviated from said preferred path;

a second row location sensor mounted on said seeder at a different location from the first row location sensor and adapted to sense the location of said standing stubble rows, said second row location sensor sending a second steering signal when said second row location sensor senses that said furrow openers have deviated from said preferred path, and a control by which the operator may select which of said row location sensors guides the seeder, thereby allowing an operator to choose the row location sensor where said standing stubble rows or furrows are most suitable and avoid a row location sensor position where said standing stubble rows have been trampled by a previous field operation;

a seeder position adjuster, said adjuster responsive to said steering signals;

where in operation said row location sensor is in a neutral position when the furrow openers of said seeder are travelling on the preferred path between the standing stubble rows, and wherein when the seeder deviates from its preferred path said row location sensor sends the steering signal to said seeder position adjuster which causes said adjuster to move the seeder to one side or the other relative to the towing vehicle so as to direct said seeder back on to the preferred path.

15. The invention of claim 14 wherein said control allows the operator to select both row location sensors to be operating, thereby allowing both said row location sensors to send steering signals to the seeder position adjuster.

16. A guidance system for guiding a seeder towed by a vehicle, said guidance system sensing locations of standing stubble rows left by a previous crop and in response to said sensing guiding the seeder so that furrow openers of said seeder travel on a preferred path between said standing stubble rows, said guidance system comprising:

a row location sensor mounted on said seeder and adapted to sense the location of said standing stubble rows, said row location sensor sending a row steering signal when said row location sensor senses that said furrow openers have deviated from said preferred path;

a furrow sensor attached to said seeder such that said furrow sensor follows an end furrow of a previous seeding pass thus acting as a marker to properly space a present seeder pass from the previous seeder pass, said furrow sensor sending a furrow steering signal when said furrow sensor is moved perpendicular to the direction of seeder travel by the deviation of the seeder from the preferred path, and further comprising a control whereby the operator can select which of said steering signals, that of said row location sensor or said furrow sensor, guides said seeder;

a seeder position adjuster, said adjuster responsive to said steering signals;

where in operation said row location sensor is in a neutral position when the furrow openers of said seeder are travelling on the preferred path between the standing stubble rows, and wherein when the seeder deviates from its preferred path said row location sensor sends the steering signal to said seeder position adjuster which causes said adjuster to move the seeder to one side or the other relative to the towing vehicle so as to direct said seeder back on to the preferred path.

17. The invention of claim 16 wherein said furrow sensor comprises a curved tube adapted to follow said end furrow of the previous seeder pass, said tube attached to said seeder such that said tube may pivot vertically and laterally, and wherein said steering signal is generated by a lateral angular position of said attachment.

18. The invention of claim 16 wherein said furrow sensor comprises first and second laterally spaced sensing elements adapted to ride along the ground, each of which may move vertically independently of the other and wherein said steering signals are generated by the vertical movement of one said sensing element relative to the other.

19. The invention of claim 18 comprising:

a sensing element frame;

said first sensing element pivotally attached to said sensing element frame about a horizontal axis substantially perpendicular to the direction of seeder travel such that said first sensing element may pivot up and down;

said second sensing element pivotally attached, at a point laterally spaced from said first sensing element, to said sensing element frame about a horizontal axis substantially perpendicular to the direction of seeder travel such that said second sensing element may pivot up and down;

a first contact element extending from said first sensing element in the direction of said second element;

upper and lower second contact elements extending from said second sensing element in the direction of said first sensing element such that when said first sensing moves up relative to said second sensing element, said first contact element comes in contact with said upper second contact element, sending a first steering signal to said seeder position adjuster, and such that when said first sensing element moves down relative to said second sensing element, said first contact element comes in contact with said lower second contact element, sending a second steering signal to said seeder position adjuster.

* * * * *